United States Patent Office 3,644,581
Patented Feb. 22, 1972

3,644,581
DIPERESTER FREE RADICAL INITIATOR FOR GRAFT POLYMERIZATION
Donald F. Knaack, Wilmington, Del., assignor to Avisun Corporation, Philadelphia, Pa.
No Drawing. Filed Dec. 5, 1968, Ser. No. 781,595
Int. Cl. C08f 15/04
U.S. Cl. 260—878
10 Claims

ABSTRACT OF THE DISCLOSURE

A polyolefin graft copolymer is prepared by the graft polymerization of at least one ethylenically unsaturated monomer onto a polyolefin using a diperester free radical initiator having the formula

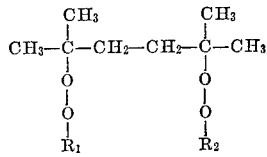

wherein $R_1$ and $R_2$ are independently selected from branched alkanoyl radicals having from 4 to 10 carbon atoms.

BACKGROUND OF THE INVENTION

This invention relates to a method for preparing graft polymerized polyolefins having improved dye receptivity and particularly to polyolefins containing crystalline polypropylene.

It is well known that hydrocarbon polymers of the non-aromatic type are very difficult to dye. Ample evidence is available in the technical literature that illustrates the fact that polyolefins exhibit little or no receptivity for dyestuffs when conventional procedures are employed. Several approaches have been proposed to remedy the problem of poor dye characteristics of polyolefins. One method involves the preparation of graft copolymers wherein a dyeable polymer such as vinyl pyridine has been grafted onto a polyolefin backbone. This technique is described in U.S. Pats. 3,049,508 and 3,073,667. Another approach is to prepare a blend of a polyolefin and a polymer that is more dyeable than the polyolefin such as a vinyl pyridine homopolymer and this method is described in U.S. Pat. 3,315,014.

An improved polyolefin composition has been obtained by the practice of this invention wherein a monoethylenically unsaturated, heterocyclic. nitrogen-containing monomer either alone or together with one or more other ethylenically unsaturated monomers is grafted onto a polyolefin backbone using particular diperester free radical initiators for the graft polymerization. When these initiators are employed to prepare dyeable polyolefin compositions, and particularly dyeable polypropylene compositions, excellent properties of the resultant dyed composition are obtained. The free radical initiators of the invention are known in the art as having utility for catalyzing the polymerization of olefinically unsaturated hydrocarbons, acids and esters. This teaching is described in U.S. Pat. No. 3,264,274. But heretofore these diperesters have not been described as efficient free radical initiators for graft polymerization to produce dyeable polyolefins.

SUMMARY OF THE INVENTION

It is an object of this invention to graft polymerize at least one ethylenically unsaturated monomer onto a polyolefin backbone using certain diperester free radical graft polymerization initiators. It is another object of this invention to prepare polyolefin compositions having improved dye affinity by the graft polymerization of at least one monoethylenically unsaturated, heterocyclic, nitrogen-containing monomer onto a polyolefin backbone wherein high conversions of monomer to graft polymer are obtained. Still another object of this invention is to obtain a dyeable polyolefin graft copolymer that is capable of being shaped into articles having excellent properties. These and other objects of the invention are accomplished by grafting at least one ethylenically unsaturated monomer onto a polyolefin backbone polymer wherein at least one monomer is a monoethylenically unsaturated, heterocyclic, nitrogen-containing monomer.

The graft polymerization is accomplished by using, as a graft polymerization free radical initiator, a diperester having the formula

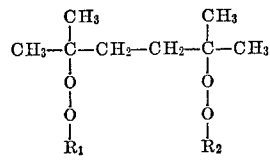

wherein $R_1$ and $R_2$ are independently selected from branched alkanoyl radicals having from 4 to 10 carbon atoms. Preferably $R_1$ and $R_2$ are alkanoyl radicals branched at the alpha position and having a total of from 4 to 8 crbon atoms. Representative $R_1$ and $R_2$ substituents are isobutyroyl, neopentanoyl, 2-ethyl butyroyl, 2-ethyl hexanoyl and 3,5,5-trimethyl-hexanoyl. Preferred free radical initiators include 2,5-dimethyl-2,5-bis(2-ethyl perhexanoyl)hexane, which is alternatively named 2,5-dimethyl-2,5-bis(2-ethyl hexanoyl peroxy)hexane and 2,5-dimethyl-2,5-bis(perneopentanoyl) hexane.

The diperester free radical initiators employed in this invention are particularly efficient for the selective polymerization of ethylenically unsaturated monomers to graft polymers onto a polyolefin backbone. Higher ratios of graft polymerized monomers to non-graft polymerized monomers are obtained by using the diperester free radical initiators described in this invention compared to using initiators commonly employed in the prior art.

DETAILED DESCRIPTION OF THE INVENTION

The polyolefins employed as the backbone polymer in the graft polymerization of this invention include polymers which contain a major proportion (i.e., greater than 50%) of polyolefins derived from 1-alkenes having from 2 to 8 carbon atoms and particularly 3 to 6 carbon atoms. Such polyolefins, therefore, include polyethylene, polypropylene, ethylene propylene block copolymers, ethylene butene-1 block copolymers, polybutene-1, poly (4-methylpentene-1), poly (3-methylbutene-1), and the like. The term polyolefin as used herein is, furthermore, intended to include copolymers of 1-alkene monomers with other copolymerizable monomers that constitute a minor proportion of the copolymer. Particularly useful polyolefin backbone polymers are those that are substantially crystalline polymers derived from 1-alkenes having from 3 to 8 carbon atoms, i.e., polymers containing at least 25%, and preferably at least 50% crystallinity as determined by density-crystallinity relationships, a technique described by J. A. Gailey et al., SPE Technical Papers (ANTEC), vol. IX, Session IV-1, pages 1 to 4, February 1963. The polyolefin base polymer may be in any physical form convenient for the graft polymerization process such as a powder, filament, pellet, fabric, etc.

In the graft copolymerization any monoethylenically unsaturated monomer may be grafted onto the polyolefin substrate and preferably at least one of the grafted monomers is a monoethylenically unsaturated, heterocyclic, nitrogen-containing monomer. Representative heterocyclic, nitrogen-containing monomers are vinyl pyridines, vinyl morpholinones and vinyl lactams such as vinyl pyrrolidones, N-vinyl succinimides and N-vinyl caprolactams. Examples of particular vinyl pyridines include 2-vinyl pyridine, 3-vinyl pyridine, 4-vinyl pyridine, 5-methyl-2-vinyl pyridine, 5-ethyl-2-vinyl pyridine, 2-methyl-5-vinyl pyridine, 2-ethyl-5-vinyl pyridine, 2-methyl-6-vinyl pyridine, 2-ethyl-6-vinyl pyridine, 2-isopropenyl pyridine, 5-propyl-2-vinyl pyridine and 2,4-dimethyl-6-vinyl pyridine. Vinyl morpholinones include N-vinyl-3-morpholinone, N-vinyl-5-methyl-3-morpholinone, N - vinyl-2-methyl-3-morpholinone, N-vinyl-5-phenyl-3morpholinone and the like.

Useful vinyl lactams include N-vinylpyrrolidones such as N-vinyl-2-pyrrolidone itself, N-vinyl-5-methyl-2-pyrrolidone, N-vinyl-3,3-dimethyl-2-pyrrolidone, N-vinyl-4,4-dimethyl-2-pyrrolidone; N-vinylpiperidones such as N-vinyl-2-piperidone, N-vinyl-6-methyl-2-piperidone, N-vinyl-3,3-dimethylpiperidone and N-vinyl-caprolactam. Other heterocyclic, nitrogen-containing monomers are N-vinyl piperidine, 2-vinyl piperidine, 4-vinyl piperidine, N-vinyl phthalimide and N-vinyl carbazole.

Ethylenically unsaturated monomers that may be graft polymerized onto the polyolefin base polymer either individually or together with an ethylenically unsaturated, heterocyclic, nitrogen-containing monomer include styrenes, vinyl toluenes, ethylenically unsaturated carboxylic acid esters, vinyl esters, ethylenically unsaturated nitriles, vinyl halides, vinylidene halides, vinyl ethers, vinyl ketones, ethylenically unsaturated amines and ethylenically unsaturated carboxylic amides. Preferred monomers within the aforementioned classes of compounds are styrene, alpha-methyl styrene, vinyl-o, m, or p-toluene, acrylonitrile, methacrylonitrile, vinyl chloride, vinylidene chloride, alkyl acrylic and alkyl methacrylic esters wherein the alkyl portion contains 1 to 8 carbon atoms such as methyl acrylate, ethyl acrylate, butyl acrylate, methyl methacrylate, butyl methacrylate, dimethylaminoethyl methacrylate, t-butylaminoethyl methacrylate, vinyl acetate, vinyl propionate, vinyl ethyl ether, vinyl n-butyl ether, vinyl isobutyl ether, vinyl 2-chloroethyl ether, vinyl methyl ketone, vinyl ethyl ketone, vinyl butyl ketone, acrylamide and methacrylamide.

The graft polymerization reaction is performed with a diperester free radical initiator such as 2,5-dimethyl-2,5-bis(perisobutyroyl) hexane; 2,5-dimethyl-2,5-bis(perneopentanoyl) hexane; 2,5-dimethyl-2,5-bis(2-ethyl perbutyroyl) hexane; 2,5-dimethyl-2,5-bis(2-ethyl perhexanoyl) hexane and 2,5-dimethyl-2,5-bis(3,5-trimethyl perhexanoyl) hexane. The diperester graft polymerization initiators employed in this invention may be prepared in high yields by the reaction of an acyl halide, particularly an acyl chloride, with a hydroperoxide. For instance, 2,5-dimethyl-2,5-bis(2-ethyl perhexanoyl) hexane may be prepared by reacting 2-ethyl hexanoyl chloride with 2,5-dimethyl-2,5-dihydroperoxide hexane in the persence of an alkali metal hydroxide such as sodium hydroxide.

The amount of graft polymerization initiator may vary from about 0.02% to about 5% or more, preferably 0.1% to about 3% by weight, based on the total weight of added polymerizable monomers. Amounts of free radical initiator in excess of 5% are not considered economical. The graft polymerization initiators employed in this invention are particularly efficient in selectively polymerizing the added polymerizable monomers to graft polymers onto the polyolefin substrate and thereby minimizing the amount of homopolymerization or random copolymerization of the added polymerizable monomers. This results in a high ratio of graft polymerized monomers to non-graft polymerized monomers. The term "non-graft polymerized monomers" is intended to define the added polymerizable monomers that polymerize by mechanisms other than graft polymerization.

Graft polymerization is accomplished in any desired manner by known graft copolymerization techniques. The monomer or monomers to be graft polymerized may be diluted in a solvent together with the polymerization initiator and this mixture added to the reaction medium containing a polyolefin backbone polymer which may be in finely-divided powder form such as a fiber or filament.

A preferred form of graft polymerization is an aqueous dispersion technique wherein a pulverulent polyolefin is dispersed in an aqueous solution containing surface active agent and then the monomer or monomers to be graft polymerized together with the free radical initiator are introduced in any way desired to the reaction medium. The monomer, singly or in combination with one or more other ethylenically unsaturated polymerizable monomers as well as the graft polymerization catalyst, may be added to the reaction vessel by incremental addition from time to time or all at once as a single charge. The graft polymerization is generally conducted at a temperature in the range of about 30° to 120° C., or more but generally in the range of about 70° to 100° C. If necessary, supra-atmospheric pressures may be used to maintain the liquid phase. The time of polymerization is not critical and may vary from about 10 minutes to 4 or more hours.

If the graft polymerization is accomplished by an aqueous dispersion technique wherein the substrate polymer powder is dispersed in an aqueous medium, the dispersing agent or surfactant may be nonionic, anionic or cationic. Preferred surfactants are the nonionic alkylphenoxypolyalkoxyalkanols having alkyl groups from 7 to 18 carbon atoms and 6 to 60 or more alkoxy units such as heptylphenoxypolyethoxyethanols, octylphenoxypolyethoxyethanols and nonylphenoxypolyethoxyethanols.

After the graft copolymerization reaction, unreacted monomer may be removed from the reaction vessel by washing the product or by vacuum distillation. The graft polyolefin may be removed from the reaction vessel, washed thoroughly with water and dried. Then the reaction product may be placed in a solvent for the non-grafted polymerized monomers such as ethanol, dimethylformamide or methyl ethyl ketone which selectively extracts any non-grafted polymerized monomers. Thereafter the reaction product is recovered, washed with water and dried in an oven. The dyeable polyolefin compositions are now ready for dye bath treatment and fabricating into the desired form.

Filaments can be spun from the graft polyolefin compositions by conventional spinning techniques. The graft compositions can be melt spun or solution spun and the filaments can then be stretched to orient the molecules and develop the desired tensile strength to the products. After shaping the graft compositions onto the filaments for other desired forms, dyeing with acid, pre-metallized or disperse dyes may be accomplished.

For purposes of illustrating the invention, the following examples are provided wherein, unless otherwise indicated, all parts and percentages are by weight:

Example 1

In a polymerization vessel equipped with a stirrer, a thermometer, inlet and outlet tubes for inert gas, and a device for admitting reactants, a solution of 1250 ml. of distilled water containing 1.60 g. of t-octylphenoxypolyethoxyethanol having an average of 10 ethoxy groups as a surfactant was introduced. The mixture was heated to 90° C. and nitrogen was bubbled through while stirring to deaerate the system. Thereafter 500 g. of 76.4 parts of a crystalline polypropylene powder having a flow rate of 4.9 (ASTM–D–1238–62T), 21.0 parts of 4-vinyl pyridine and 2.6 parts of styrene were charged together with 0.25%, based on the weight of the 4-vinyl pyridine and styrene monomers, of 2,5-dimethyl-2,5-bis(2-ethyl perhexanoyl) hexane. Heating at 90° C. was continued for one hour and at the end of this time the grafted polypropylene powder was removed by filtration, washed thoroughly with water and dried in a vacuum oven.

The total conversion of the 4-vinyl pyridine and styrene monomers to polymer was 90%. Non-grafted polymerized monomers were extracted with dimethylformamide in a Soxhlet apparatus. Analysis indicated that 62% of the charged monomers (69% of the polymerized monomers) were present in the reaction product as graft polymers. The ratio of graft polymerized monomers to non-graft polymerized monomers was 2.2 to 1. Thus 2,5-dimethyl-2,5-bis (2-ethyl perhexanoyl) hexane was a very efficient initiator for graft polymerization.

An inhibitor system comprising 0.1% (based on the weight of polypropylene) of 2,6-ditertiarylbutyl 4-methyl phenol, 0.5% dilauryl thiodipropionate and 0.15% calcium stearate was blended into the dry grafted polymer powder and the mixture was passed through an extruder and pelletized. After melt spinning into fibers, the grafted polypropylene was prepared for dye bath treatment.

Prior to dyeing, the fiber was prescoured in an aqueous solution of 1.0% (OWF) of t-octylphenoxypolyethoxyethanol having an average of 10 ethoxy units and 1.0% (OWF) soda ash for about 30 minutes at 82° C. The abbreviation "OWF" means on the weight of the fiber or article. Thereafter the fiber was dyed in an aqueous dye bath containing 2% (OWF) Capracyl Red G (Du Pont), a neutral pre-metallized dyestuff, and then washed for 15 minutes at 60° C. in an aqueous solution of 1.0% (OWF) t-octylphenoxypolyethoxyethanol having an average of 10 ethoxy units. The fibers were dyed to a deep red shade.

Evaluation of the dyed fiber showed excellent light fastness, wash resistance and dry cleaning resistance properties.

Example 2

Using the apparatus and procedure described in Example 1, 68.5 parts of the crystalline polypropylene polymer of Example 1 were introduced to the reaction vessel containing a solution of water and surfactant. While stirring, a charge of 28.0 parts of 4-vinyl pyridine, 3.5 parts of styrene and 0.25% of 2,5-dimethyl-2,5-bis (2-ethyl perhexanoyl) hexane were added. After stirring for an additional one hour at 90° C., the reaction product was recovered by filtration. Analysis indicated 100% conversion of monomers to polymer of which 61% of the charged monomers were graft copolymerized. The ratio of graft polymerized monomers to non-graft polymerized monomers was 1.5 to 1.

Example 3

The same procedure and quantities of reactants employed in Example 2 were used with the exception that the graft polymerization initiators were 0.10% of 2,5-dimethyl-2,5-bis (2-ethyl perhexanoyl) hexane and 0.25% t-butyl-2-ethyl perhexanoate, the amount of catalyst based upon the total weight of the 4-vinyl pyridine and styrene monomers. As in Example 2, polymerization was conducted for one hour at 90° C. followed by recovery of the reaction product. Total conversion of monomers to polymer was found to be 94% and 65% of the charged monomers were graft polymerized monomers. Thus the ratio of grafted polymerized monomers to non-grafted polymerized monomers was 2.1 to 1.

Example 4

Another experiment is performed as described in Example 2 using the same reactants in the same quantities except that 0.10% of 2,5-dimethyl-2,5-bis (2-ethyl hexanoyl peroxy) hexane and 0.10% of t-butyl-2-ethyl perhexanoate were employed as the graft polymerization initiators. The conversion of monomers to polymer was 86%, and which 60% of the charged monomers were accounted for as grafted copolymer. The ratio of grafted polymerized monomers to non-grafted polymerized monomers was 2.3 to 1.

Example 5

The graft polymerization procedure of Example 1 was repeated with the exception that 2-methyl-5-vinyl pyridine was substituted for 4-vinyl pyridine but the same amount of styrene was employed. After polymerizing for one hour at 90° C., the graft copolymer was recovered and similar conversions to graft copolymer were obtained.

Example 6

Again the procedure of Example 1 was repeated using the same materials and quantities with the exception that the graft polymerization initiator was 2,5-dimethyl-2,5-bis (perisobutyroyl) hexane. After polymerizing for one hour at 90° C., the product was recovered from the reaction medium. High conversion to graft copolymer were obtained.

In another run following the same procedure, similar conversions were measured when the initiator was 2,5-dimethyl-2,5-bis (3,5,5-trimethyl perhexanoyl) hexane.

Example 7

Using the apparatus and following the procedure described in Example 1, 70 parts of the crystalline polypropylene described in Example 1 were charged to a reaction vessel containing an aqueous solution and a surfactant to disperse the polypropylene. While stirring, a monomer charge of 30 parts of N-vinyl-2-pyrrolidone was added together with 0.5%, based on the total weight of the monomer, of 2,5-dimethyl-2,5-bis (perneopentanoyl) hexane. Selective conversion of monomers to graft copolymer was obtained.

This example was repeated using 0.3% of 2,5-dimethyl-2,5-bis (2-ethyl perhexanoyl) hexane as the graft copolymerization initiator and a monomer mixture of equal parts of 4-vinyl pyridine and acrylonitrile. Good conversions to graft copolymer were obtained.

Example 8

Example 1 was repeated except that the alpha-olefin polymer was a propylene-ethylene terminal block copolymer having a flow rate of 4.0 and the free radical initiator was 0.3% of 2,5-dimethyl-2,5-bis (perneopentanoyl) hexane. Good conversions to graft copolymer were obtained.

EXAMPLE 9

For purposes of comparing the graft polymerization initiators of this invention with certain conventional free radical graft polymerization initiators, the following runs were made: (a) Using the apparatus described in Example 1 and following the same procedure and employing the same quantities of reactants and other additives, a graft copolymer was prepared from 76.4 parts of the crystalline polypropylene polymer described in Example 1, 28.0 parts of 4-vinyl pyridine and 3.5 parts of styrene while using 0.5% of lauryl peroxide and 0.10% of benzoyl peroxide as the graft polymerization initiators. After polymerization, the total conversion of monomers to polymer was 90%. Analysis indicated that 38% of the charged monomers were graft polymerized. The ratio of graft polymerized monomers to non-graft polymerized monomers was 0.73 to 1.

(b) In another run using the same apparatus, procedure and reactants as in Example 5(a) above, 65.0 parts of the crystalline polypropylene powder described in Example 1, 17.5 parts of 4-vinyl pyridine and 17.5 parts of styrene were charged together with 0.50% of lauryl peroxide and 0.50% of benzoyl peroxide, based on the total weight of the monomers, into a solution of distilled water containing a surfactant to disperse the polypropylene powder. After polymerization for one hour at 90° C., there was a 79% conversion of 4-vinyl pyridine and styrene monomers to polymer and 35% of the charged monomers were graft polymerized. The ratio of graft polymerized monomers to non-graft polymerized monomers was 0.80 to 1. The polymerization reactions of Examples 9(a) and (b) clearly demonstrate the superior effectiveness of the initiators of this invention for graft polymerization.

I claim:

1. In a process for the graft polymerization of at least one ethylenically unsaturated monomer onto a polyolefin wherein said polyolefin is derived from 1-alkenes having from 2 to 8 carbon atoms, the improvement wherein the free radical initiator for the graft polymerization is a disperester having the formula

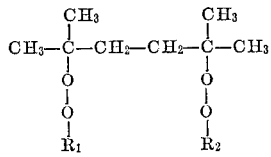

wherein $R_1$ and $R_2$ are independently selected from branched alkanoyl radicals having from 4 to 10 carbon atoms, the amount of said disperester being about 0.02% or more, based on the weight of said monomer.

2. A process according to claim 1 wherein at least two monoethylenically unsaturated monomers are graft polymerized onto a polyolefin, one of said monomers being monoethylenically unsaturated, heterocyclic, nitrogen-containing monomer selected from the group consisting of vinyl pyridines, vinyl norpholinones and vinyl lactams.

3. A graft polymerization process according to claim 1 wherein said polyolefin is a crystalline propylene polymer and said ethylenically unsaturated monomer is a vinyl pyridine.

4. A graft polymerization process according to claim 1 wherein $R_1$ and $R_2$ are independently selected from the group consisting of 2-ethylhexanoyl, 2-ethylbutyroyl and neopentanoyl.

5. A graft polymerization process according to claim 1 wherein $R_1$ and $R_2$ represent 2-ethylhexanoyl.

6. A process according to claim 1 wherein at least one ethylenically unsaturated monomer is a monoethylenically unsaturated, heterocyclic, nitrogen-containing monomer selected from the group consisting of vinyl pyridines, vinyl morpholinones and vinyl lactams, said polyolefin is polypropylene, said $R_1$ and $R_2$ represent 2-ethylhexanoyl, and the amount of said initiator being about 0.1% to about 3% by weight, based on the weight of said monomer.

7. A process according to claim 6 wherein a second ethylenically unsaturated monomer selected from the group consisting of styrene, and alpha-methyl styrene is graft polymerized onto said polyolefin.

8. A process according to claim 1 wherein said polyolefin is polypropylene.

9. A process according to claim 1 wherein the amount of said disperester may vary from about 0.02% to about 5% by weight, based on the total weight of said ethylenically unsaturated monomer.

10. The process according to claim 1 wherein said polyolefin is polypropylene and the amount of said diperester may vary from about 0.1% to about 3% by weight, based on the total weight of said ethylenically unsaturated monomer.

References Cited
UNITED STATES PATENTS

| | | | |
|---|---|---|---|
| 2,858,326 | 10/1958 | Ashby | 260—453 |
| 3,049,507 | 8/1962 | Stanton et al. | 260—45.5 |
| 3,073,667 | 1/1963 | Bonvicini et al. | 8—115.5 |
| 3,264,274 | 8/1966 | Leveskis | 260—80 |
| 3,322,712 | 5/1967 | Gardner et al. | 260—29.6 |

HARRY WONG, Jr., Primary Examiner

U.S. Cl. X.R.

260—29.6, 32.6, 32.8, 33.4, 896, 897